(No Model.) 2 Sheets—Sheet 1.

B. C. MOLLOY.
APPARATUS FOR AMALGAMATING GOLD.

No. 363,411. Patented May 24, 1887.

Witnesses
Will T. Norton
Henry G. Dieterich

Inventor,
Bernard C. Molloy
By John J. Halsted & Son
his Att'ys

N. PETERS, Photo-Lithographer, Washington, D. C.

(No Model.) 2 Sheets—Sheet 2.

B. C. MOLLOY.
APPARATUS FOR AMALGAMATING GOLD.

No. 363,411. Patented May 24, 1887.

Witnesses
Will F. Norton
George Rea

Inventor
Bernard C. Molloy
By his Attorneys
John J. Halsted & Son

UNITED STATES PATENT OFFICE.

BERNARD CHARLES MOLLOY, OF LONDON, ENGLAND.

APPARATUS FOR AMALGAMATING GOLD.

SPECIFICATION forming part of Letters Patent No. 363,411, dated May 24, 1887.

Application filed April 27, 1886. Serial No. 200,316. (No model.)

*To all whom it may concern:*

Be it known that I, BERNARD CHARLES MOLLOY, of 3 Elm Court Temple, in the city of London, England, barrister-at-law, member of Parliament, and a subject of the Queen of Great Britain, have invented certain new and useful Improvements in Apparatus for Amalgamating Gold and other Precious Metals; and I do hereby declare that the following is a full, clear, and exact description of the invention, which will enable others skilled in the art to which it appertains to make and use the same.

My invention consists in apparatus which, without the application of any fixed pressure or force, secures an intimate and continued contact between the particles of the crushed ore or compound containing the gold or other precious metals with the surface of the mercury to be used for the purpose of amalgamation.

To facilitate an explanation of the invention, I will describe an apparatus with certain dimensions and of a particular form; but I do not confine myself to any particular form, size, or shape.

Figure 1:
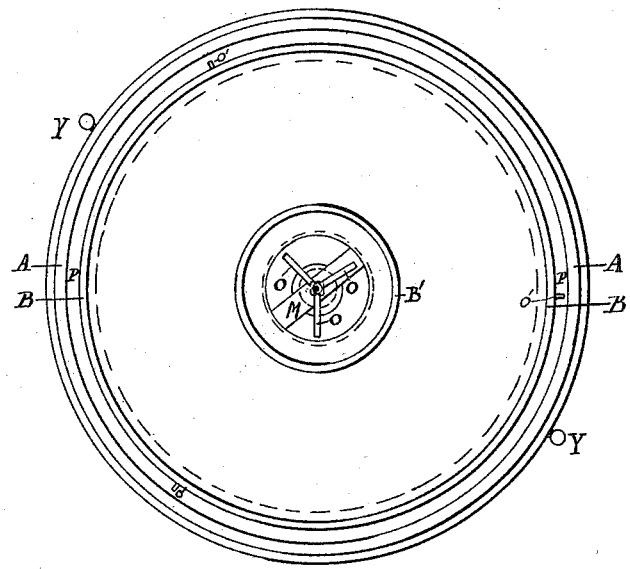
Figure 3:
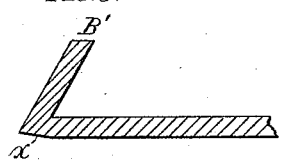
Figure 4:
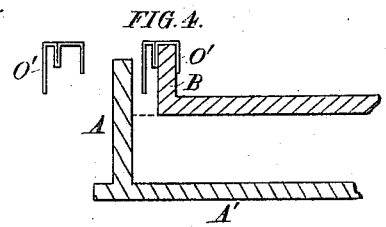
Figure 2:
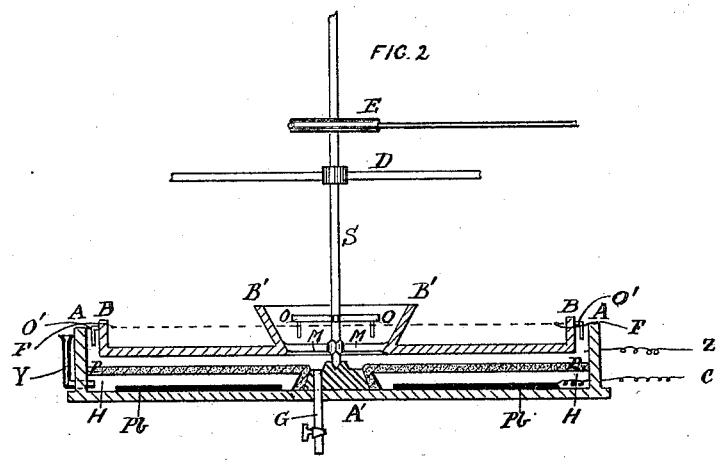
Figure 5:
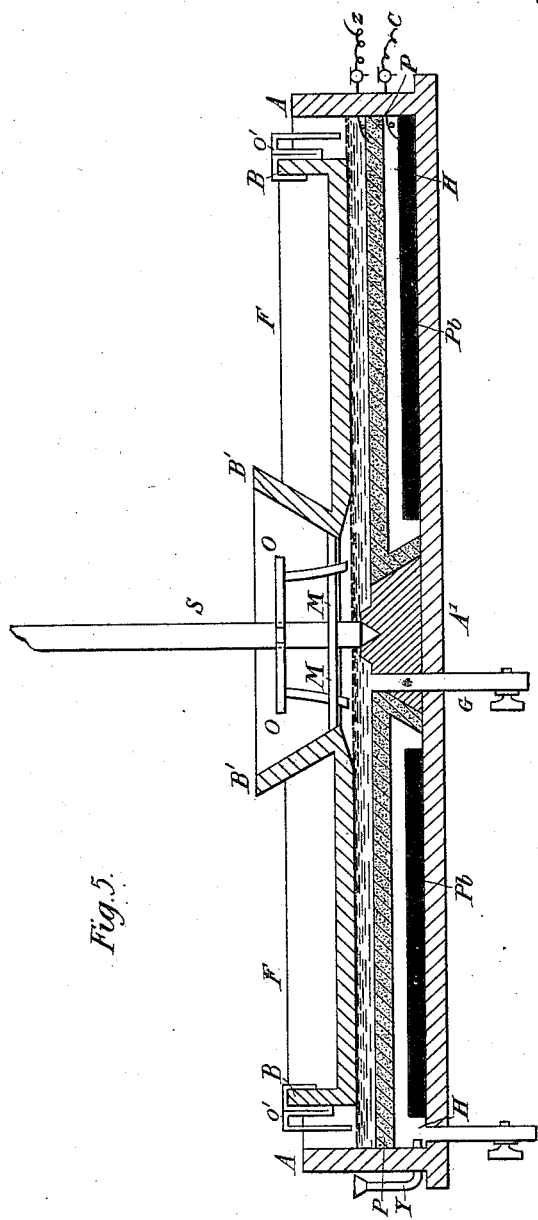

Figure 1 is a plan, the central spindle, with its pulley, being removed; Fig. 2, a vertical section; Fig. 3, a fragmentary detail, enlarged; Fig. 4, a fragmentary detail, enlarged, showing a removable stirrer; and Fig. 5 an enlarged view of Fig. 2, the cross-bar D and pulley being omitted.

A A' A is a circular tray thirty-six inches inside diameter, the sides of which, A A, may be three inches high. This tray or vessel, it is evident, should be capable of containing fluids, and sufficiently solid in its construction.

B B is a disk, say, thirty-five inches outside diameter, the sides of which may be two or three inches high, so as to rise higher when in action than the sides A A, or, where the overflow is arranged at a particular point, higher than such overflow. It has an opening in the center nine inches in diameter, fitted to which is the hopper B' B'. A cross-bar, M M, is fitted so as to centrally span this aperture. This cross-bar may be made of iron two inches wide, one-fourth of an inch thick, and pierced in the center with a square hole, through which the spindle passes freely without in any way supporting the disk, but yet capable of causing the disk to revolve.

S is a spindle, which, passing through the cross-bar M M, works in the base-socket, as shown. The upper end of the spindle passes through and works in the fixed cross-bar D, and is fitted with a crown-driving wheel, E. The object of this spindle arrangement and cross-bar can be obtained by other well-known devices.

O O are wire-like stirrers, which may be attached to the spindle, and which, by agitation merely, keep the ore suspended in the water. The tray, which is fitted with the tap G, contains mercury an inch deep, (more or less,) the mercury rising to about one-half an inch from the top of A A or other overflow. The disk B B floats upon the surface of the mercury, so that their respective surfaces are in contact. This floating of the disk, in connection with its capacity to rise and fall freely, enables it to follow the irregular motion of the irregular centrifugal wave and automatically to adapt itself to any depth of mercury in the outer pan. It will be seen that, due to this loose joint at the aperture in cross-bar H H, the disk can be removed at any time by merely lifting up the spindle.

The outside of the disk may be fitted with wire-like stirrers o' o', (which are not scrapers,) adjustable and removable, so as to prevent when necessary the settling of the treated ore.

The spindle may be fitted with stirrers O O, to keep the ore from settling in the hopper B' B'. The lower end of the hopper is cut away, sloping outward to the mercury, as shown at x. (See Fig. 3.)

When the apparatus is in action, the ore (or ore and water) is conducted by any suitable means into the hopper, and the supply properly regulated. The motion given to the pulley E acting upon the spindle causes the disk to revolve. The revolution of the disk may be obtained by other suitable and convenient means. The number of revolutions may be twenty (more or less) to the minute. As the disk revolves the ore floats under the bevel x, and then, with the centrifugal wave, creeps under the disk in a thin layer, and then, by the centrifugal action, is worked outward on the surface of the mercury, while the circular action of the disk drags it laterally, so that the ore is worked spirally outward, rolling upon the surface of the mercury till it reaches the uncovered mercury in the open space between the outside of the disk and the inside of the tray. Here the wet ore is prevented settling or clogging, the ore being held in suspension in the water by the action of the outside stirrers, O'. The slimes, thus kept in a state of agitation by the stirrers, rise till they overflow and pass away free from any particles of mercury, because, due to the agitation of the slimes, the specific gravity of the mercury is free to carry any such particles down to the body of the mercury in the tray. This overflow may be all around or only at a given point, as may be found convenient. The ore will thus by the action of the disk have been rolled on the surface of the mercury from ten to fifteen seconds.

The speed of the revolutions and the length of contact may be regulated in accordance with the character of the ore.

The parts A A' A and B B' may be constructed of wood, ebonite, slate, iron, or other suitable material.

When the mercury is electro-chemically quickened, the apparatus is fitted with a porous diaphragm, P P, as herein stated. When the electro-chemical arrangement is used, if iron or other metal is used, care must be taken to secure the necessary insulation, so that the current shall pass from the anode through the electrolyte and diaphragm to the mercury cathode.

In order to prevent the "sickening" and "flouring" of the mercury by, (among other) such ores as arsenical pyrites, I preserve the "quickness" of the mercury by the following means: I interpose between the bottom of the tray A A' A a porous diaphragm, P P, fitting tightly to the sides, which leaves a space or compartment, H, of, say, one inch between the diaphragm and the bottom of the vessel A A' A; and this space may be conveniently filled with sand. This porous diaphragm may be constructed of porous plate, cement, skins, non-resinous wood, and many other substances, and I do not limit myself to any particular material for the diaphragm, as there are many materials suitable for this purpose. The compartment H is fitted with carbon, platinum, lead, or other suitable anode, P$^b$, having an electrical connection. Where leather, for instance, is used to form the diaphragm, then the compartment H H may be the same size as and fitting to the bottom of what would then be the top rim of the tray A A' A, the leather diaphragm intervening and the two boxes being clamped together tightly. The diaphragm may conveniently be supported by a bed of sand saturated with the electrolyte, and so that the diaphragm itself in every case is saturated with the electrolyte.
The diaphragm is covered to the depth of, say, one-half an inch with mercury, and which thus rests upon or against the diaphragm, but so that the surface of the mercury is lower than the level of the overflow. This body of mercury has an electrical connection, which may be formed, say, by a platinum wire resting in the mercury and passing through the substance of the side of the tray (and, of course, where necessary, insulated) at any convenient point. The mercury here will constitute the cathode, and is connected by means of the platinum wire with the zinc or negative pole of a voltaic battery of two or more couples in series, as may be deemed sufficient, or with the negative pole of any other electromotor—
such as a dynamo-machine—while the carbon or other anode in the compartment H is connected with the positive pole of the same electromotor. An inclination should be given to the diaphragm, where necessary, to prevent the accumulation of oxygen on its under surface, and outlets for escape should be made round the higher edges, but so as not to break the supporting and containing surface of the diaphragm and tray. When the electrolyte is, for instance, dilute sulphuric acid or the solution of an alkaline sulphate, then the evolution of oxygen may be avoided by the use of the metal lead as the positive electrode or anode, in which case a peroxide of this metal is formed. In this latter case the lead anode may conveniently be coated with porous lead.

The aqueous electrolyte contained in compartment H may be any which will give hydrogen at the mercury cathode, or hydrogen and a metal electro-positive to hydrogen. For example, sulphuric acid diluted with twelve parts of water, to give hydrogen at the cathode; or a solution of caustic soda, or of a salt of soda, to give hydrogen and sodium at the cathode. Diaphragms of leather are unsuitable with alkaline solutions. When the apparatus is in action—for example, with a solution of caustic soda—I use an electro-motive force, which in ordinary cases need be no higher than four volts. This electro-motive force will cause the evolution of hydrogen at the cathode, (such evolved hydrogen being the excess of the quantity required to form hydrogen amalgam,) and a small proportion of the alkaline metal will also be separated. An amalgam of sodium and mercury containing but a small proportion of the former metal would when used as a positive element in conjunction with a carbon negative and an aqueous electrolyte give an opposing electro-motive force of less than three volts. Such an amalgam could therefore, as is well understood, be obtained by means of an electro-motive force of four volts.

The electrical resistance in the circuit constituted by the apparatus being very small, electrical power is not wasted. I do not limit myself to any definite electro-motive force, but in every case it must be greater than the counter electro-motive force generated within the apparatus itself.

When dilute sulphuric acid is the electrolyte, I prefer to use an anode of lead; but when the electrolyte is an alkaline solution this metal should not be employed. In such a case I prefer to employ carbon, platinum, or copper. The apparatus being thus so far arranged and the electrical connections duly made, then the current of electricity will pass from the anode in compartment H, through the aqueous electrolyte and diaphragm to the mercury cathode, and produce the desired hydrogen amalgam at the expense of the hydrogen, resulting from the decomposition of the electrolyte, the oxygen being retained or evolved at the anode. These conditions being secured, the crushed ore and water are passed into the hopper and under the disk, as previously described. A jet of water may play on the ore as it escapes from underneath the disk. The difference in the specific gravity of the ore and the mercury makes the separation of the ore and the mercury and the carrying away of the former easy under the conditions named.

Y is a tube or tubes through which the electrolyte may be supplied. By these means the particles of gold, or ore carrying gold, and all float-gold will be brought into intimate contact with and rolled in the body of the mercury, maintained in a "quick" or "unsickened" condition. The ore so discharged will have thus passed through and been rolled over and against a considerable quantity of surface of quick mercury, by which a prolonged contact between the mercury and the ore will have been secured. When lead is used as the anode and becomes oxidized, it may be reduced by reversing the current after the mercury has been withdrawn, using the same electrolyte, and using carbon as an anode against the peroxide of lead (which is to be reduced) as the cathode.

Having now particularly described and ascertained the nature of my said invention and in what manner the same is to be performed, I declare that what I claim is—

1. In an amalgamating apparatus, the combination of a pan with a disk having a central hopper and means for revolving the same, a mercury-containing vessel having a porous diaphragm separating the mercury which constitutes the cathode from a carbon or other anode in an aqueous electrolyte, and suitable electrical connections, as and for the purposes described.

2. In an amalgamating apparatus, the combination of a pan, a disk carrying a central shallow hopper for the ore, beveled at its lower edge, means for revolving the same, a porous diaphragm between the disk and the bottom of the pan and separating the mercury which constitutes the cathode from a carbon or other anode in an aqueous electrolyte, and suitable electrical connections, all as and for the purposes described.

3. In an amalgamating apparatus, the combination of a pan, a disk having stirrers at its periphery and carrying a central shallow hopper for the ore, such hopper being beveled at its lower edge, means for revolving the same, a porous diaphragm between the disk and the bottom of the pan and separating the mercury which constitutes the cathode from a carbon or other anode in an aqueous electrolyte, and suitable electrical connections, all as and for the purposes described.

BERNARD CHARLES MOLLOY.

Witnesses:
ALFRED GEORGE BROOKES,
JOHN GOODEL.